(12) United States Patent
Williams et al.

(10) Patent No.: US 11,550,799 B2
(45) Date of Patent: Jan. 10, 2023

(54) METHOD AND SYSTEM FOR RETRIEVING AND DISPLAYING DATA FROM AN ENTITY NETWORK DATABASE

(71) Applicant: Adarga Limited, London (GB)

(72) Inventors: Matthew James Williams, London (GB); Nicholas Campbell Fellingham, London (GB)

(73) Assignee: Adarga Limited, London (GB)

( * ) Notice: Subject to any disclaimer, the term of this patent is extended or adjusted under 35 U.S.C. 154(b) by 0 days.

(21) Appl. No.: 17/250,781

(22) PCT Filed: Sep. 12, 2019

(86) PCT No.: PCT/GB2019/052553
§ 371 (c)(1),
(2) Date: Mar. 3, 2021

(87) PCT Pub. No.: WO2020/053588
PCT Pub. Date: Mar. 19, 2020

(65) Prior Publication Data
US 2021/0319036 A1   Oct. 14, 2021

(30) Foreign Application Priority Data

Sep. 14, 2018 (EP) .................................... 18194626

(51) Int. Cl.
*G06F 16/2457* (2019.01)
*G06F 16/248* (2019.01)
(Continued)

(52) U.S. Cl.
CPC ...... *G06F 16/24578* (2019.01); *G06F 16/248* (2019.01); *G06F 16/287* (2019.01); *G06F 16/288* (2019.01); *G06K 9/6276* (2013.01)

(58) Field of Classification Search
CPC ............. G06F 16/24578; G06F 16/248; G06F 16/287; G06F 16/288; G06K 9/6276
See application file for complete search history.

(56) References Cited

U.S. PATENT DOCUMENTS 9,787,705 B1* 10/2017 Love .................... G06F 16/9024
9,836,522 B2* 12/2017 Nemery ............ G06F 16/24578
(Continued)

FOREIGN PATENT DOCUMENTS

EP            2827530 A1     1/2015

*Primary Examiner* — Jorge A Casanova
(74) *Attorney, Agent, or Firm* — Downs Rachlin Martin PLLC

(57) ABSTRACT

A computer-implemented method of retrieving and displaying data from an entity network database (130) comprising a plurality of entities and a plurality of relationships between the entities is provided. The method comprises receiving a selection of a plurality of anchor entities of the entity network database; retrieving a plurality of connector entities of the entity network database, each connector entity disposed on a path in the entity network database extending between at least two of the anchor entities; determining a relevance score for each of the connector entities, the relevance score reflecting the relevance of each connector entity to the anchor entities; and displaying the connector entities within a shape defined by the anchor entities, wherein the distance of each connector entity from the anchor entities is based on the relevance score of the connector entity.

14 Claims, 10 Drawing Sheets

(51) Int. Cl.
 *G06F 16/28* (2019.01)
 *G06K 9/62* (2022.01)

(56) References Cited

U.S. PATENT DOCUMENTS

| | | | |
|---|---|---|---|
| 10,936,669 B2* | 3/2021 | Li | G06F 16/906 |
| 2013/0282710 A1 | 10/2013 | Raghavan et al. | |
| 2015/0254370 A1* | 9/2015 | Sexton | G16Z 99/00 |
| | | | 707/798 |
| 2015/0286747 A1* | 10/2015 | Anastasakos | G06F 40/40 |
| | | | 707/776 |
| 2016/0092789 A1* | 3/2016 | Codella | G06N 20/00 |
| | | | 706/12 |
| 2018/0025093 A1* | 1/2018 | Xia | G06F 16/9024 |
| | | | 707/602 |
| 2018/0081880 A1* | 3/2018 | Kennedy | G06F 16/24578 |
| 2019/0005115 A1* | 1/2019 | Warrier | G06K 9/6276 |
| 2019/0182382 A1* | 6/2019 | Mazza | H04L 51/02 |
| 2020/0175314 A1* | 6/2020 | Fang | G06K 9/623 |

* cited by examiner

METHOD AND SYSTEM FOR RETRIEVING AND DISPLAYING DATA FROM AN ENTITY NETWORK DATABASE

FIELD

The present application relates to a computer-implemented method and system for retrieving and displaying data from an entity network database.

BACKGROUND

Increasingly, there is a need to store data in a graph-based form, for example using graph databases or data stores, such as Neo4j® or OrientDB®. Such graph data stores are of particular utility in the storage of entity networks, which model knowledge relating to entities (e.g. people, places, organisations, events), and the relationships between those entities. The graph data store represents the entities as nodes within the graph, with relationships between entities represented by the edges of the graph.

Graph data stores are increasingly accessed by myriad analysts, who interrogate the graph data store in order to investigate the relationships stored therein. For example, graph data stores may be used by insurance analysts seeking to investigate the links between companies and individuals in order analyse risk, financial analysts seeking to assess the value of companies, or by journalists seeking to uncover and report on links public figures or entities that were hitherto not mainstream knowledge. In other examples, fraud analysts interrogate graphs in order to identify fraudulent transactions or criminal activity in data. Using such data stores, which are typically constructed by automatically extracting the entities and relationships from a corpus of texts, means that the user need not read hundreds or thousands of individual documents to establish the relationships between the entities.

Whilst query languages (e.g. Cypher Query Language, Gremlin graph traversal language) exist for graph data stores, they are useful only in retrieving all the entities and relationships meeting particular criteria. However, as the size of the datasets grows, the number of relationships between the entities grows. This scale makes it difficult for a user querying the graph data store to obtain meaningful information relating to the entities and their relationships. For example, in a graph database based on news data compiled by the applicant over a 12-month period, the "United States" entity had over 50,000 neighbouring entities (i.e. entities connected to "United States" by a path of length 1). Determining which of these vast numbers of neighbouring entities are particularly salient to the subject entity is therefore non-trivial.

It is an aim of the invention to overcome the above-mentioned difficulties, and any other difficulties that would be apparent to the skilled person upon reading the description herein. It is an aim of the invention to provide an improved means of querying an entity network database to retrieve relevant relationships between entities and displaying those relationships to a user.

SUMMARY

According to the present invention there is provided an apparatus and method as set forth in the appended claims. Other features of the invention will be apparent from the dependent claims, and the description which follows.

According to a first aspect of the invention there is provided a computer-implemented method of retrieving and displaying data from an entity network database, the entity network database comprising a plurality of entities and a plurality of relationships between the entities, the method comprising:

receiving a selection of a plurality of anchor entities of the entity network database;

retrieving a plurality of connector entities of the entity network database, each connector entity disposed on a path in the entity network database extending between at least two of the anchor entities;

determining a relevance score for each of the connector entities, the relevance score reflecting the relevance of each connector entity to the anchor entities; and displaying the connector entities within a shape defined by the anchor entities, wherein the distance of each connector entity from the anchor entities is based on the relevance score of the connector entity.

By the term "entity network database", it is meant a database storing a network or graph comprising a plurality of entities and a plurality of relationships between the entities.

By the term "anchor entity", it is meant an entity stored in the entity network database which forms the base or seed of a query. The selection of anchor entities may be provided by a user via a user interface.

The shape may be a circle, wherein the anchor entities are disposed on a circumference of the circle. The method may comprise displaying the shape.

The method may comprise retrieving the connector entities by querying the entity network database according to the method defined below in the second aspect. The method may comprise selecting connector entities from the entities returned by the query.

The method may further comprise retrieving non-connector entities of the entity network database, each non-connector entity being connected to only a single one of the anchor entities, and displaying the non-connector entities outside the shape. The method may comprise retrieving the non-connector entities by querying the entity network database according to the method defined below in the second aspect. The method may comprise selecting non-connector entities from the entities returned by the query.

The method may comprise displaying relationships between the connector entities and the anchor entities. The method may comprise displaying relationships between pairs of connector entities. The method may comprise displaying relationships between the non-connector entities and the anchor entities. The method may comprise displaying relationships between pairs of non-connector entities.

The method may comprise ordering the anchor entities, wherein the ordering maximises the relatedness of adjacent anchors. The step of ordering the anchor entities may comprise computing a closeness measure between each pair of anchor entities of the plurality of anchor entities. The closeness measure may be based on the number of simple paths connecting each pair of anchor entities. The step of ordering the anchor entities may comprise maximising a utility value based on the closeness measure of all pairs of anchor entities in the plurality of anchor entities. The step of ordering the anchors may comprise selecting an ordering with a maximum utility value. The ordering with maximum utility value may be found by enumeration or using an optimisation algorithm such as an integer linear program. It will be appreciated selecting an ordering with a maximum utility value is equivalent to selecting an ordering with a minimum cost value.

The step of ordering the anchor entities may comprise calculating a canonical order of the anchors, which represents all rotated and mirrored orderings of the anchor entities.

Determining the relevance score for each of the connector entities may comprise determining a node centrality score for each of the connector entities. The node centrality score may be determined using an algorithm employing a random walk model. The algorithm may be PageRank with Priors. The algorithm may be Hyperlink-Induced Topic Search (HITS), HITS with Priors, Betweenness centrality or Katz centrality.

The connector entities may be arranged so that connector entities of higher relevance score are positioned further away from the anchor entities. The distance of each connector entity from the anchor entities may be proportional to its relevance score. Connector entities having higher relevance scores may be positioned closer to a centre of a notional shape than connector entities having lower relevance scores The method may comprise receiving a selection of a connector entity or a non-connector entity as anchor entity by receiving user input dragging it to the perimeter of the notional shape. The method may comprise deselecting an anchor entity by receiving user input which drags it away from the perimeter of the shape.

The entity network database may be a graph database.

A position of each connector entity and/or non-connector entity may be determined using a force-directed layout algorithm.

It is explicitly intended that the preferred features defined in the paragraphs above may be combined in any combination. Furthermore, the preferred features defined below in respect of the second aspect may also be combined with the first aspect in any combination.

According to a second aspect of the invention there is provided a computer-implemented method of querying an entity network database, the entity network database comprising a plurality of entities and a plurality of relationships between the entities, the method comprising:
 receiving a selection of a plurality of anchor entities of the entity network database;
 retrieving a plurality of entities and relationships of the entity network database based on the selected anchor entities;
 wherein retrieving the plurality of entities and relationships comprises:
  retrieving an anchor neighbourhood subgraph from the entity network database, the anchor neighbourhood subgraph comprising the selected anchor entities and a plurality of neighbour entities, each neighbour entity being connected to at least one of the anchor entities by a relationship;
  determining a relevance score for each of the neighbour entities in the anchor neighbourhood subgraph; and
  returning the k most relevant neighbour entities, the relationships therebetween, and the relationships between the k most relevant neighbour entities and the selected anchor entities.

The method may comprise retrieving the anchor neighbourhood subgraph by constructing and executing a query on the entity network database. The query may be in the Cypher query language or Gremlin graph traversal language.

Determining the relevance score for each of the neighbour entities may comprise determining a node significance score, based on a global degree of the entity, the global degree of the entity being the degree of the entity within the entity network database, and/or an internal degree of the entity, the internal degree being the degree of the entity within the anchor neighbourhood subgraph. The node significance score of a node v may be calculated using the following formula:

$$SIG(v) = \frac{ID(v)}{GD(v)}$$

wherein ID(v) is the internal degree and GD(v) is the global degree of the node v.

Determining the relevance score for each of the neighbour entities may comprise determining a node centrality score for each of the neighbour entities. The node centrality score may be determined using an algorithm employing a random walk model. The algorithm may be PageRank with Priors. The algorithm may be Hyperlink-Induced Topic Search (HITS) or HITS with Priors.

Determining the relevance score for each of the neighbour entities may comprise:
 determining a node significance score, based on the global degree of the entity within the entity network database, and the internal degree of the entity within the anchor neighbourhood subgraph;
 determining a node centrality score for each of the neighbour entities; and
 determining the relevance score based on the node significance score and the node centrality score.

k may be in the range of 50 to 110, preferably 60 to 100, more preferably 70 to 90, more preferably 75 to 85. k may equal 80. All references to ranges herein are inclusive of the endpoints.

According to a further aspect of the invention there is provided a computer system comprising:
 at least one processor; and
 at least one memory storing at least a part of an entity network database, the entity network database comprising a plurality of entities and a plurality of relationships between the entities;
 instructions that, when executed by the at least one processor cause the computer device to perform any of the methods set forth herein.

According to a further aspect of the invention there is a tangible non-transient computer-readable storage medium is provided having recorded thereon instructions which, when implemented by a computer device, cause the computer device to be arranged as set forth herein and/or which cause the computer device to perform any of the methods set forth herein.

BRIEF DESCRIPTION OF DRAWINGS

For a better understanding of the invention, and to show how embodiments of the same may be carried into effect, reference will now be made, by way of example only, to the accompanying diagrammatic drawings in which.

Corresponding reference numerals are used to refer to corresponding elements throughout the drawings.

DESCRIPTION OF EMBODIMENTS

In overview, examples of the invention provide a means of retrieving relevant relationships and entities from an entity network database, based on a selection of anchor entities. In some examples, a means of displaying the relevant entities and connections is provided, which involves displaying relevant entities and connections within a shape defined by the anchor entities (e.g. a circle), wherein entities having higher relevance scores are positioned closer to a centre of the shape than connector entities having lower relevance scores. It will be understood that the terms "node" and "entity" are used interchangeably throughout the disclosure herein. Similarly, the terms "edge" and "relationship" are used interchangeably throughout the disclosure herein.

Figure 1:
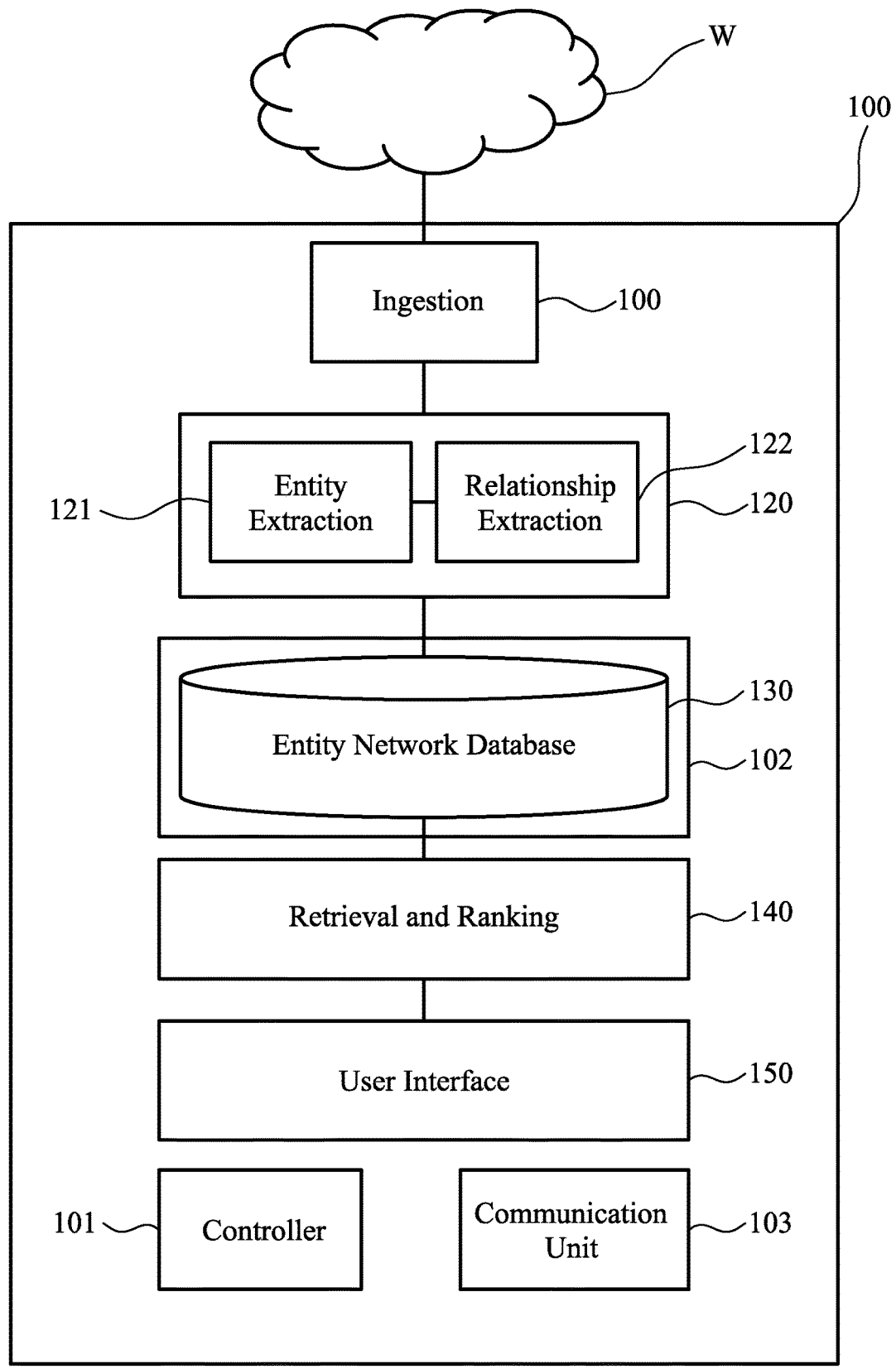
FIG. 1 is a schematic view of an example computer system.

FIG. 1 is an overview of an example computer system 100 for retrieving and displaying data from an entity network database.

The computer system 100 comprises a controller 101, a memory 102 and a communication unit 103. The controller 101 is configured to control the other elements of the computer system, and comprises one or more processors. The memory 102 is configured to store, permanently or temporarily, any relevant data required for the operation and control of the computer system 100, and particularly any instructions which when executed cause the controller to carry out the methods described herein. In addition, the memory 102 stores the entity network database 130. The communication unit 103 is configured to manage communications over a network between the computer system 100 and other connected devices. The communication unit 103 may comprise suitable network hardware, including network interface cards and the like.

It will be appreciated that the computer system 100 described herein may comprise a single computer device or a plurality of computer devices, wherein each computer device comprises at least one memory and at least one processor or controller. For example, the computer system 100 may be a computer server accessible by one or more client devices over a suitable computer network. In some examples, one or more of the modules or units of the computer system 100 are located remotely from each other on separate computer devices. For example, the entity network database 130 may be hosted on a separate server. It is explicitly envisaged that the entity network database 130 may be a distributed database, distributed over a plurality of computer devices, wherein each device stores at least a part of the entity network database 130. In still further examples, the computer system 100 may be at least partly hosted in a cloud computing environment.

The computer system 100 comprises an ingestion module 110, an information extraction module 120, an entity network database 130, a retrieval and ranking module 140 and a user interface module 150.

The ingestion module 110 is configured to retrieve new documents from which entities and relationships may be extracted and subsequently stored in the entity network database 130. In one example the ingestion module 110 is configured to retrieve documents from the World Wide Web W, for example using a web scraper or crawler. The ingestion module 110 ingests documents from one or more sources, which may for example comprise online news feeds (i.e. newly-published articles from content providers such as news websites) or social media posts. Furthermore, the documents may be keyword filtered, such that only documents containing certain predetermined keywords are retrieved.

It will be understood that the sources and/or the keyword filters selected will differ depending on the purpose of the entity network database 130. For example, a database 130 suitable for querying by a fraud analyst will typically ingest from sources that provide finance-related news, and keywords may be used to filter out documents that are not related to finance (e.g. news articles related to sport).

In one example, the ingestion module 110 ingests documents on a periodic basis—e.g. by crawling particular sources on a daily or hourly basis.

The information extraction module 120 is configured to extract entities and relationships from the documents retrieved by the ingestion module 120. The information extraction module 120 comprises an entity extraction unit 121, configured to identify the entities mentioned in a document.

In one example, the entity extraction unit 121 is further configured to classify each identified entity into one of a plurality of predetermined categories. For example, the entity extraction unit 121 may classify each entity as a person, an organisation or a location. In further examples, alternative or additional classes may include "event" or "artefact". In certain examples, the entity extraction unit 121 is configured to employ more fine-grained classifications—e.g. country/city rather than merely location, or "vehicle" or "product" rather than merely "artefact".

The information extraction module 120 further comprises a relationship extraction unit 122, configured to identify one or more relationships between the entities identified by the entity extraction unit 121. In one example, the relationship extraction unit 121 is configured to identify a co-occurrence relationship between two entities. In other words, a relationship is generated between two entities that reflects that they were both mentioned in the same document. In further examples, additional relationships are identified by the relationship extraction unit 121. Example relationships include set membership (i.e. X is a Y), employment (X works for Y), location (X is located in Y), as well as other relationships such as "adversary of" and "colleague of". It will be appreciated that these are merely exemplary selections, and a wide range of relationships is possible. In one example, the information extraction module 120 comprises a machine learning classifier configured to identify the relationships. In other examples, predetermined rules or heuristics may be employed to identify the relationships.

Similarly to the sources and keywords, it will be appreciated that the categories of entities and the relationships identified may be selected depending upon the purpose of the entity network database 130.

The information extraction unit 120 is further configured to insert the extracted entities and relationships into the entity network database 130. For example, the information extraction unit 120 formulates a query string for inserting the entities and relationships, and accesses an API offered by the entity network database 130 in order to execute the query.

In some examples, the information extraction module 120 is configured to pre-process the documents before carrying out the entity extraction and relationship extraction, in order to improve the accuracy of the entity extraction and relationship extraction. These pre-processing steps may include one or more of the following: stripping the text of HTML; tokenisation; stemming and/or lemmatisation; the removal of stop words; chunking and/or parsing.

The entity network database 130 is configured to store the extracted entities and relationships. The entity network database 130 is further configured to store metadata relating to each of the nodes and/or relationships. In one example, the entity network database 130 is a graph database—i.e. a database designed specifically to store and retrieve graph data, wherein the extracted entities are the nodes and the extracted relationships are the edges between the nodes. In particular, the graph database may be Neo4j®, which can be queried using the Cypher® query language. However, in further examples, the graph database and/or query language may differ. For example, the graph database may be OrientDB®. In addition, the query language may be Gremlin.

However, the entity network database 130 need not be a graph database. In other examples, a relational database management system (RDBMS) or a NoSQL database is used to store the entities, relationships and any associated metadata.

In one example, the degree of each entity (i.e. the number of relationships each entity possesses) is calculated by the system 100 each time a new relationship is created in the entity network database 130. This precomputed degree is then stored in the database 130, for example as metadata associated with the entity, so as to avoid the necessity for repeatedly calculating the degree of each entity at run time.

The retrieval and ranking module 140 is configured to receive a selection of two or more anchor entities A. The anchor entities are entities stored in the entity network database 130, about which relevant entities and relationships are sought. These effectively form the base of the user's query—rather than entering a query string, the user simply selects relevant entities about which further information is required. In one example, the selection of anchor entities is carried out using the user interface module 150, as will be discussed in more detail below.

The terms "anchor" and "anchor entity" are used interchangeably throughout.

Figure 2:
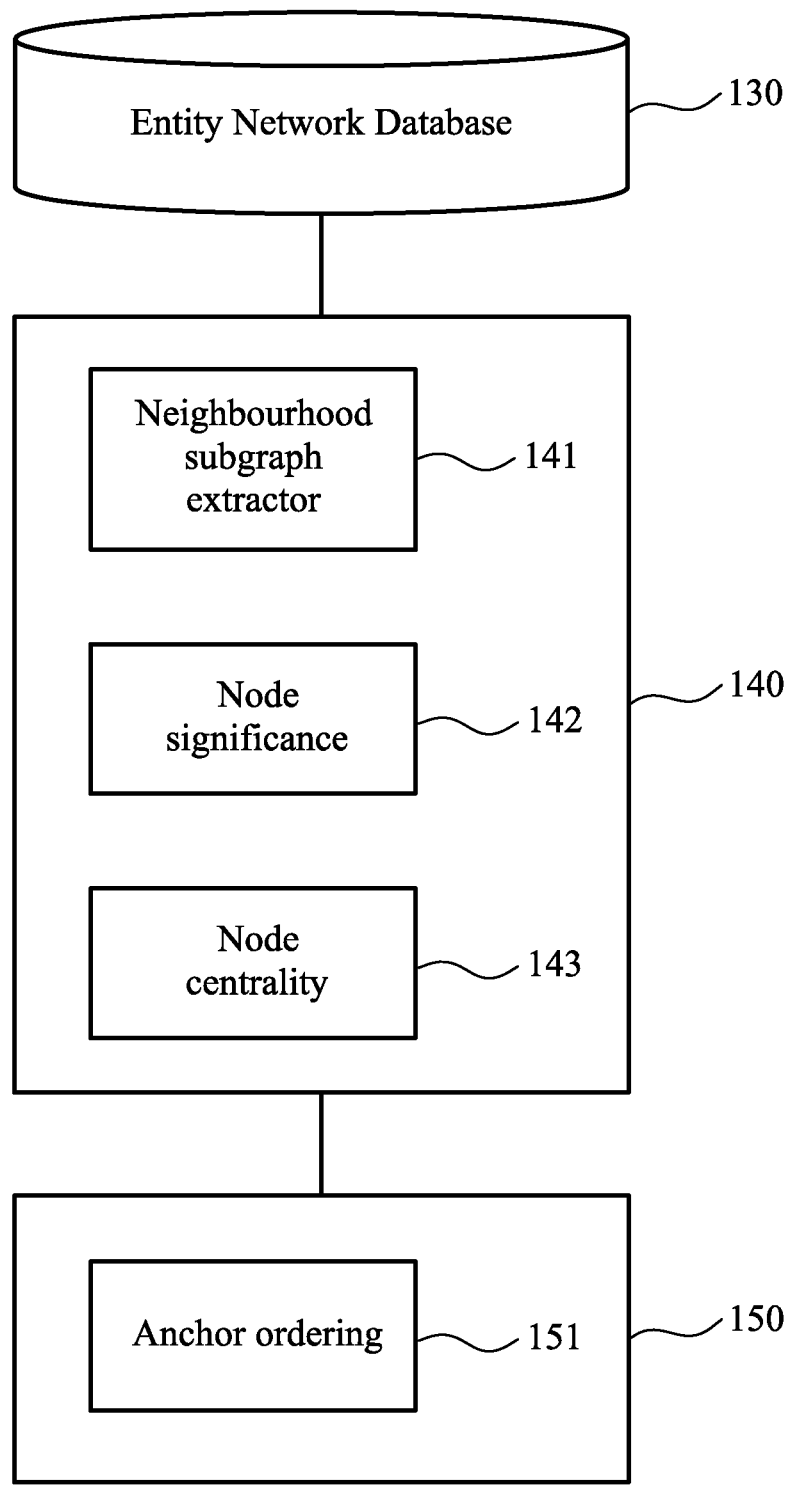
FIG. 2 is a schematic view of the example computer system of FIG. 1 in more detail.

Turning now to FIG. 2, the retrieval and ranking module 140 is shown in more detail. The retrieval and ranking module 140 comprises an anchor neighbourhood subgraph retrieval unit 141, a node significance unit 142 and a node centrality unit 143.

The anchor neighbourhood subgraph retrieval unit 141 is configured to retrieve a subgraph from the entity network database 130 comprising the selected anchor entities and any neighbouring entities. By neighbouring entities, it is meant those entities that are connected to one of the anchor entities by a path of length 1. This subgraph is referred to herein as the "anchor neighbourhood subgraph".

In one example, the anchor neighbourhood subgraph retrieval unit 141 is configured to construct and execute a query string (e.g. a Cypher® query string in the case of Neo4j®), for example by accessing an API associated with the entity network database 130. The API then returns the anchor neighbourhood subgraph.

The anchor neighbourhood subgraph retrieval unit 141 may be configured to limit the maximum number of neighbours retrieved per anchor entity to a value $n_{max}$. Accordingly, the size of the anchor neighbourhood subgraph is limited to $n_{max} \times |A|$, so that compute time does not grow excessively. For example, the anchor neighbourhood subgraph may be limited to 1000 neighbours per anchor.

The $n_{max}$ neighbours per entity may be selected arbitrarily (e.g. the first $n_{max}$ neighbours returned). Alternatively, the $n_{max}$ most connected neighbours (i.e. the anchors with the highest degree) are selected. In further alternative, the neighbours are sampled based on their degree, so that a mixture of degrees are retrieved.

The node significance unit 142 is configured to calculate a significance score for each node in the anchor neighbourhood subgraph. In one example, the significance score (SIG) for each node v is calculated according to the following formula:

$$SIG(v) = \frac{ID(v)}{GD(v)}$$

GD is the global degree of the node v—i.e. the number of connections the node v has in the entity network database 130. As discussed above, in some examples this value may be calculated when a relationship involving the node is created in the database 130 (i.e. when the node receives a new neighbour), and may therefore simply be retrieved rather than calculated at runtime. In other examples, the degree is calculated at runtime.

ID is the internal degree of each node v—i.e. the number of connections the node v has in the anchor neighbourhood subgraph.

The node centrality unit 143 is configured to calculate a node centrality score (CEN) for each node v in the anchor neighbourhood subgraph. In one example, the node centrality score is calculated by using an anchored random walker over the anchor neighbourhood subgraph, which therefore reflects the level of connectivity of the node v through the subgraph from the anchor entities. Accordingly, nodes that are highly reachable from the anchors receive a higher score.

In one example, the node centrality unit 143 is configured to calculate the node centrality score based on the PageRank with Priors algorithm, which is disclosed in S. White and P. Smyth, "*Algorithms for estimating relative importance in networks*", Proceedings of the ninth ACM SIGKDD international conference on knowledge discovery and data mining (ACM, 2003), pp. 266-275, the contents of which are hereby incorporated by reference.

In detail, a vector is constructed of prior probabilities for each node v in the anchor neighbourhood subgraph, wherein anchor nodes are each assigned a probability of $1/|A|$ and all other nodes are assigned a probability of 0. In other words, the random walk has an equal likelihood of beginning at one of the anchor nodes, and a zero probability of beginning at one of the other nodes. The algorithm calculates the probability that a random walk of the anchor neighbourhood graph arrives at v. The algorithm also includes a damping factor $\alpha$, wherein there is a $1-\alpha$ probability that the walker teleports to one of the anchor nodes, rather than walking to an adjacent node.

The previous description provides a conceptual model of the centrality score. In practice, the scores are computed using the mathematically equivalent method of matrix power iteration, which is an established computational approach to calculating PageRank with Priors for networks of non-trivial size. An initial probability vector p is constructed with the prior probabilities described in the previous paragraph. The network's adjacency matrix is translated into a transition matrix M, which is a column-stochastic matrix representing the probability of transitioning from one node to another. An initial probability vector $x_0$ is constructed with the same values as the initial vector p. Computing scores follows by iteratively calculating $$x_t := \alpha \cdot x_{t-1} M + (1-\alpha) \cdot p$$

Iteration continues until either convergence criteria are met or, in case the case of non-convergence, up to a maximum number of iterations. The resulting probability vector $x_t$ (after t iterations) represents an approximation of the random walk model described above.

It will be understood that other node centrality measures may be employed. For example, Hyperlink-Induced Topic Search (HITS), which may also be referred to as Hubs and Authorities or HITS With Priors, both of which are described in the S. White and P. Smyth publication referenced above. Further alternative node centrality measures include Betweenness centrality and Katz centrality, which are described in M. E. J. Newman, *Networks; an introduction*, Oxford University Press, Oxford, U K. 2010, the contents of which are incorporated by reference. It will be appreciated that node scores provided by any of the above-mentioned node centrality measures may be normalised so that all node scores sum to 1.

The retrieval and ranking unit 140 is configured to calculate a hybrid relevance score (HYB) for each node v in the anchor neighbourhood subgraph, wherein the hybrid relevance score combines the significance score SIG and the centrality score CEN. For example, the hybrid score may be calculated as follows:

$$HYB(v) := CEN(v) \cdot SIG(v)$$

The retrieval and ranking unit 140 is configured to rank all nodes v, excluding the anchor nodes A, by the hybrid relevance score. In one example, the retrieval and ranking unit 140 is configured to discard nodes having a degree of 1. The retrieval and ranking unit 140 then returns the top-k highest scoring entities and the relationships between these entities. In one example, k=80, though it will be appreciated that the specific value of k may be varied depending upon the number of relevant entities required. It has been found that values of k beyond 80 result in too many entities being displayed to the user, impairing their ability to readily determine the links therebetween. These top-k scoring nodes and the relationships therebetween are effectively the result of a query, wherein the query input is the selection of anchor nodes A.

Returning to FIG. 2, the user interface module 150 is shown in more detail. The user interface module 150 is configured to receive a selection of anchor entities from a user, and display the results of the query based on the selected anchor entities.

The user interface module 150 may take any suitable form for receiving user input and displaying information to the user. In one example, the user interface module 150 is a web-based user interface. In other words, the user interface module 150 comprises a web server, accessible by a client device (e.g. a PC, tablet or mobile device). In other examples, the user interface module 150 may comprise an application installable on a client device connected to the computer system 100, or on the computer system 100 itself.

Figure 3:
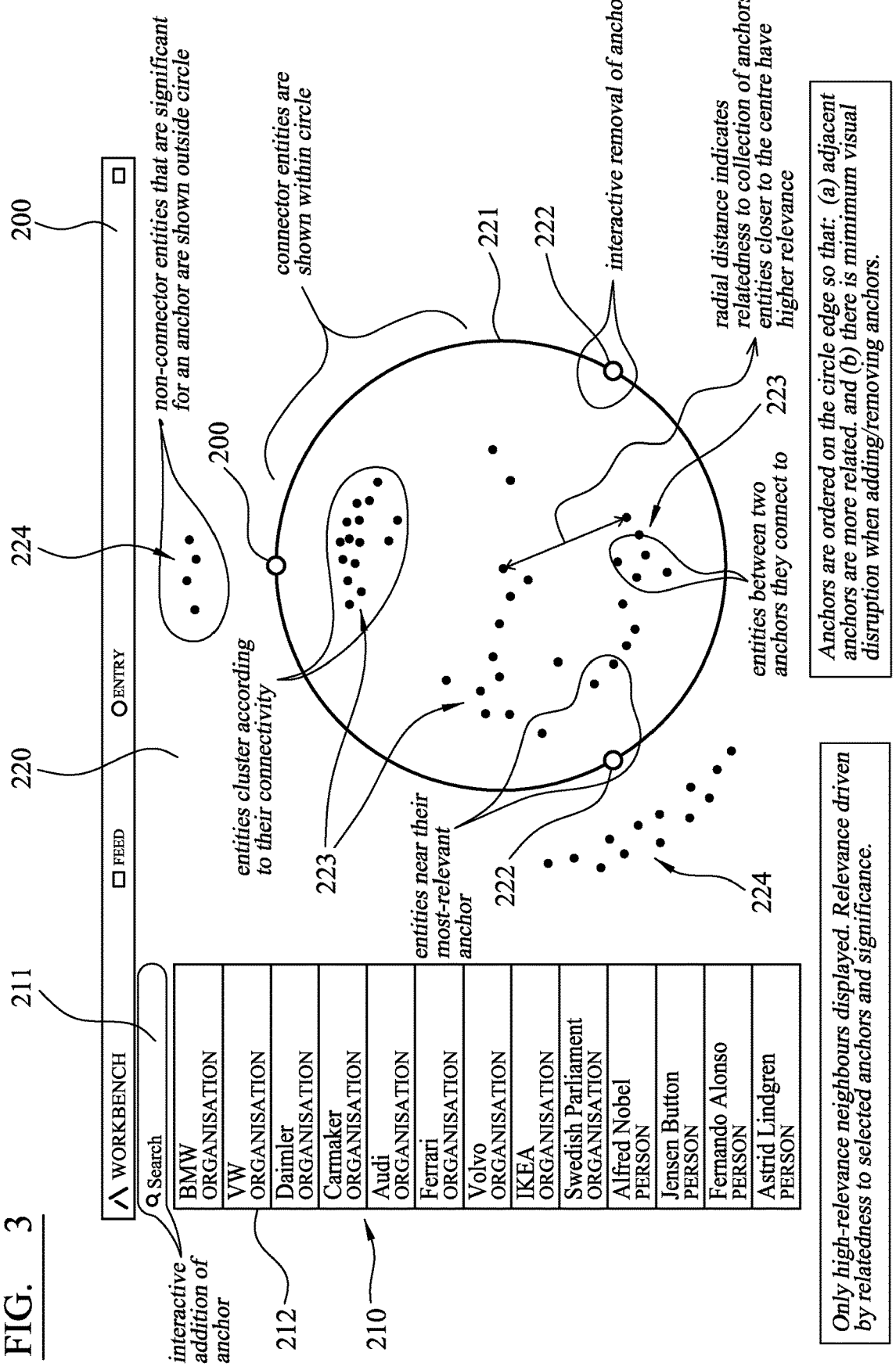
FIG. 3 is a view of example user interfaces of the user interface module of the computer system of FIGS. 1 and 2.

FIG. 3 shows an exemplary user interface 200 displayed by the user interface module 150. The user interface comprises an anchor input section 210, and a connection display section 220.

The anchor input section 210 is configured to receive a selection of anchor entities from a user. In one example, the anchor input section 210 comprises a search bar 211 and a results list 212. The user interface module 150 is configured to receive a text string via the search bar 211, and return a list of matching (or similar) entities from the entity network database 130. Accordingly, the user interface module 150 is configured to construct and execute a query based on the received text string. The returned list of entities is then displayed in the results list 212. In some examples, the category of each entity is also displayed on the results list 212.

The results list 212 is further configured to receive a user selection of the returned entities. The selected entities become the anchor entities. For example, a user may click on an entity in the result list to select it. Alternatively, the user may drag and drop an entity onto the connection display section 220 in order to select it.

The user interface 200 is configured to display the results of the query as a graph, wherein each entity is represented by a node (e.g. a small circle or dot) and the relationships between entities are represented by a line. The user interface 200 is configured to display the selected anchor entities 222 around the periphery of a shape 221 (e.g. a circle) in the connection display section 220.

In one example, the anchor entities 222 are ordered. That is, a specific ordering of the anchor entities 222 is established, which reflects the relatedness of the anchor entities. Accordingly, the user interface module 150 comprises an anchor ordering unit 151, configured to calculate the ordering.

In one example, the anchor ordering unit 151 is configured to calculate the ordering based on the anchor neighbourhood subgraph comprising the selected anchors 222. In other examples, the anchor ordering unit 151 is configured to calculate the ordering based on the pruned neighbourhood subgraph—i.e. the subgraph comprising the top-k scoring nodes and the relationships therebetween as returned by the ranking and relevance module 140. The anchor neighbourhood subgraph retrieval unit 141 is used to retrieve the anchor neighbourhood subgraph, as disclosed hereinabove. Given the set of anchors $A=\{a_1, \ldots, a_n\}$ and the anchor neighbourhood subgraph, a closeness measure $c(a_i, a_j)$ is calculated for each pair of anchors in A.

In one example, the closeness measure is defined as:

$$c(a_i, a_j) := \sum_{p \in P(a_i, a_j)} \frac{1}{PathLen(p)}$$

wherein $P(a_i, a_j)$ is the set of all simple paths p from anchor $a_i$ to anchor $a_j$, and wherein PathLen(p) is the length of the simple path. It will be understood that simple paths are paths in the anchor neighbourhood subgraph that do not involve the repetition of nodes. This measure may be referred to as the inverse-simple-path-lengths measure. In one example, the set P of simple paths p is limited to paths under a certain length. In one example, the length is two. It will be appreciated that other closeness measures may be employed, which may or may not be based on simple paths. Furthermore, alternative measures need not be network-based measures. For example, an alternative measure of closeness between two anchors might be the number of documents that contain a direct relationship between the two anchors.

Accordingly, the closeness measure c is higher if the two anchor nodes are more similar, because a larger number of shorter simple paths connect them.

The anchor ordering unit 151 is configured to calculate the optimal ordering of anchors, based on the closeness measure c. In one example, the ordering unit 151 carries out an optimisation procedure, in which the UTILITY(S) of a particular anchor ordering $S = \langle a_{i_1}, \ldots, a_{i_n} \rangle$ is defined as:

$$\text{UTILITY}(S) := c(a_{i_n}, a_{i_1}) + c(a_{i_1}, a_{i_n}) + c(a_{i_1}, a_{i_2}) + c(a_{i_2}, a_{i_1}) + c(a_{i_2}, a_{i_3}) + c(a_{i_3}, a_{i_2}) + \ldots + c(a_{i_{n-1}}, a_{i_n}) + c(a_{i_n}, a_{i_{n-1}})$$

The anchor ordering unit 151 is configured to select an ordering that maximises the UTILITY(S).

Due to the fact that the anchors 222 are distributed around the periphery of the circle 221, the orderings are invariant to rotation and/or reflection. In other words, the anchor ordering $\langle a_1, a_2, a_3 \rangle$ is equivalent to $\langle a_2, a_3, a_1 \rangle$ and $\langle a_3, a_2, a_1 \rangle$. Accordingly, in one example the anchor ordering unit 151 is configured to determine a canonical ordering for each of these equivalent orderings, so that the UTILITY(S) is not repeatedly calculated unnecessarily.

The anchor ordering unit 151 may define an ordering property for the anchor nodes. In one example, $a_i < a_j$ if-and-only-if the following conditions hold:

$GD(a_i) > GD(a_j)$ and the text label of $a_i$ is lexicographically less than $a_j$.

This ordering property can then be used to derive the canonical order as follows. Firstly, the order is rotated so that the first anchor is the anchor that is greater than all the other anchors in the set A according to the ordering property. Secondly, this ordering is compared to a mirrored ordering, the mirrored ordering retaining the same first anchor (e.g. $\langle a_1, a_2, a_3, a_4 \rangle$ is compared with $\langle a_1, a_4, a_3, a_2 \rangle$). Whichever ordering preserves more of the ordering according to the ordering property is chosen. In other words, the ordering which maximises the number of times each node is greater than the subsequent node is chosen.

In addition, defining the ordering property ensures that the order remains stable if anchors are removed or added, thereby avoiding a substantial reordering which can confuse the user.

In one example, the anchor ordering 151 is configured to select the ordering that maximises the UTILITY(S) by calculating the cost of each ordering S and then selecting the ordering S with the maximum utility. In other examples, an optimisation algorithm, such as an integer linear program may be employed to find an ordering with maximum utility, rather than by enumerating each ordering.

The disclosure above frames the anchor ordering as a maximisation problem, wherein the object is to find the ordering with the maximum utility. It will be appreciated that the same task could be framed as a minimisation problem, in which the object is to find the ordering that minimises a cost value, wherein a higher cost value is indicative of a more distant relationship between adjacent nodes.

Returning to FIG. 4, the user interface module 150 is configured to supply the selected anchor nodes 222 to the retrieval and ranking module 140, and receive the top-k most relevant entities and the relationships connecting them as outlined hereinabove. Upon receipt of these entities and relationships, the user interface unit 150 is configured to display the received entities and relationships on the connection display section 220.

Connector entities 223—i.e. entities that lie on at least one path extending between two or more of the anchor nodes 222—are displayed in the interior of the circle 221. In one example, the user interface module 150 is configured to arrange the connector entities 223 that are more relevant closer to the centre of the circle 221.

In one example, the user interface module 150 uses the node centrality unit 142 to calculate the node centrality score of each of the entities 223, which functions as the relevance score for the purpose of arranging the entities 223.

In one example, the radial distance of each entity 223 from the centre of the circle 221 is inversely proportional to its relevance—i.e. the radial distance is a function of the relevance score.

In other examples, the relevance score may be used to categorise the entities into a plurality of discrete bins, such that each bin comprises entities within a particular range of relevance score. Accordingly, each entity in a particular bin is displayed at the same radial distance, wherein entities in bins with a higher relevance are display closer to the centre of the circle 221.

The angle of each entity 223 with respect to the centre of the circle 223 (i.e. the position of each entity 223 on the circumference of a notional circle centred at the centre of circle 223 and having a radius equal to the radial distance of that entity 223 from the centre) is determined using a force directed layout algorithm. The force directed layout algorithm calculates a level of attraction or repulsion between proximate entities 223 and positions them accordingly. In one example, the force directed layout algorithm is the algorithm provided in the d3-force javascript library (https://d3js.org/). In other examples, the force directed layout algorithm is provided by the Gephi Toolkit (https://gephi.org/toolkit/) or the Sigma JS toolkit (http://sigmajs.org/).

Consequently, although the radial distance is set based on overall relevance to the set of anchors as a whole, the position of an entity 223 with respect to other entities and individual anchors is reflective of its relevance.

In one example, entities 224 that are connected to only a single one of the anchor nodes (i.e. non-connector entities) 222 are displayed on the exterior of the circle. The position of entities 224 is also determined using the force directed layout algorithm. In one example, the distance of each of the entities 224 from the centre of the circle 221 is also inversely proportional to its relevance. The relevance may be calculated in the same manner as for entities 223.

In one example, the relationships between the entities 222/223/224 are displayed in the form of lines connecting the entities 222/223/224.

In one example, the user interface unit 150 is configured to allow the user to add another entity 223/224 to the set of anchors, leading to the re-execution of the query as outlined above, and the re-display of the relevant entities 223/224. In one example, this is accomplished by double clicking on the entity 223/224. In other examples, the entity 223/224 may be dragged to the circumference of circle 221, whereupon the dragged entity is thereby selected as an anchor entity, Similarly, the user interface unit 150 permits the anchor entities 222 to be dragged from their position on the circumference of the circle, whereupon the dragged anchor 222 is deselected as an anchor entity.

An example of the use of system 100 will now be described with reference to FIGS. 6A-6E. FIGS. 6A-6E are views of the connection display section 220 of the user interface 200, as a series of anchor entities are selected.

Figure 6A:
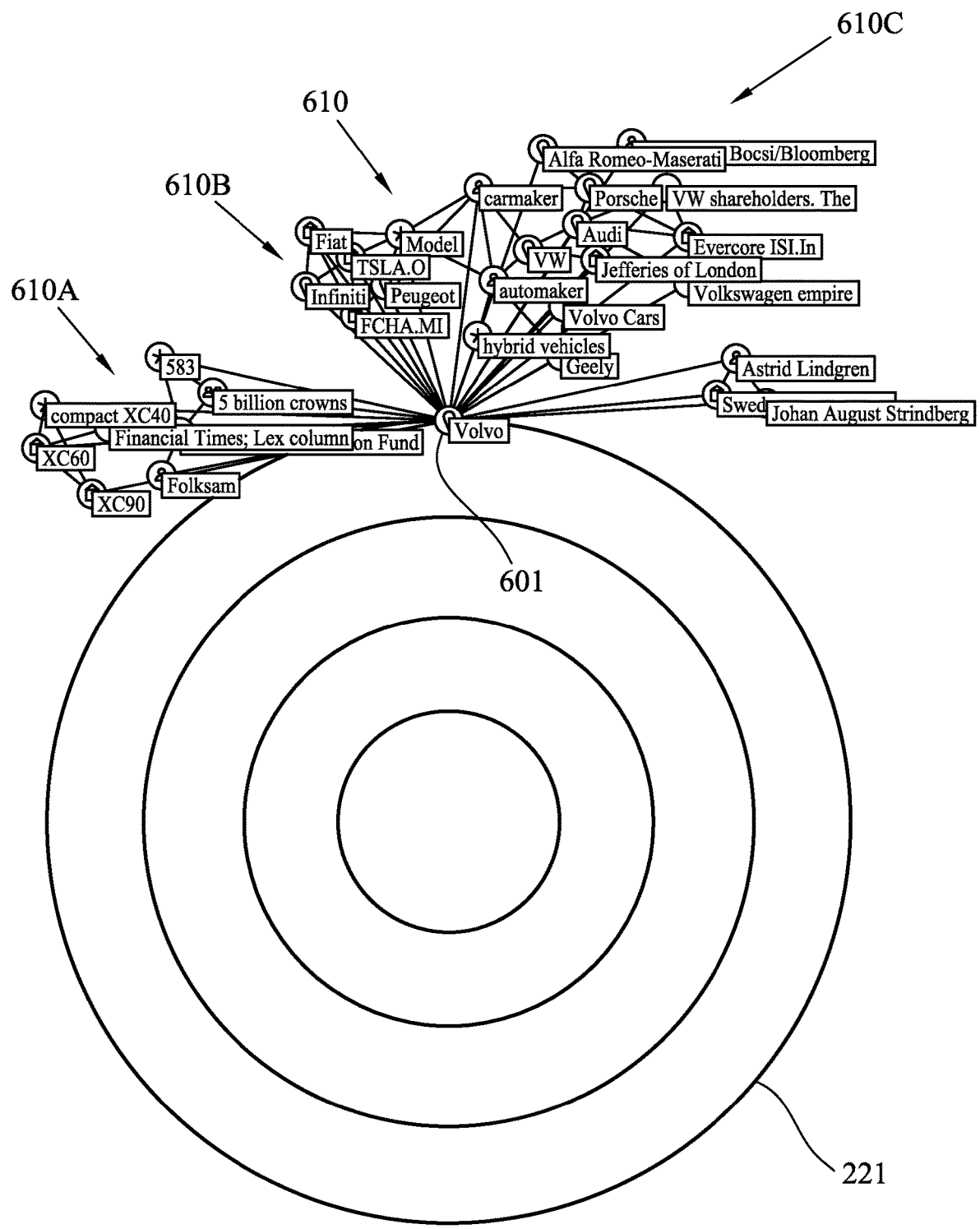
FIG. 6A-6E are views of example user interfaces of the example computer system of FIGS. 1-2.

FIG. 6A shows the connection display section 220 with a single anchor entity 601 selected, in this case the car maker Volvo. As only a single anchor 601 is present, the entities 610 returned by the query are by definition non-connector entities, and therefore are displayed outside the circle 221. The entities 610 include models of cars (610A), other car makers (610B) and related persons (610C).

Figure 6B:
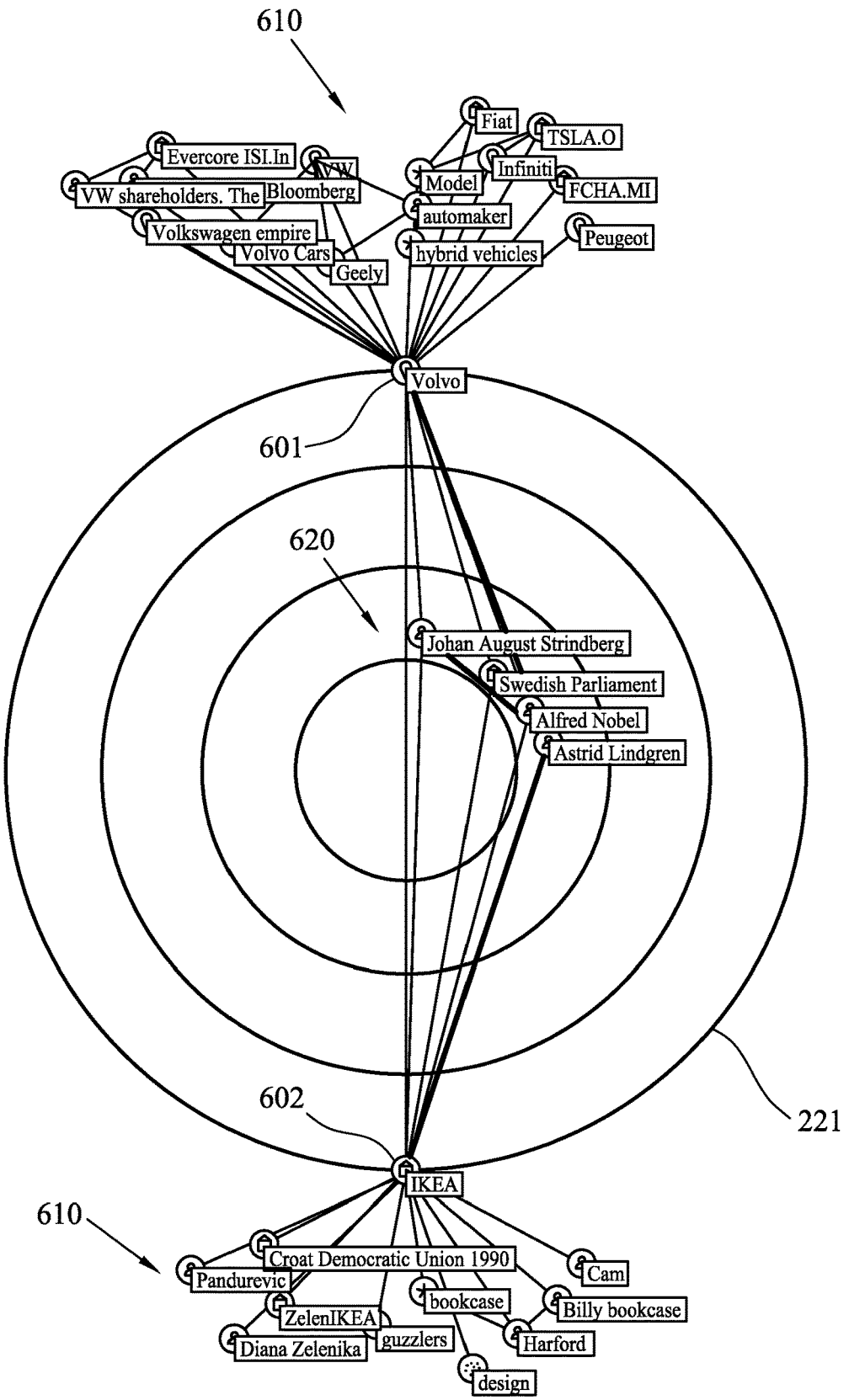

FIG. 6B shows the connection display section 220 with the addition of a second anchor entity 602, in this case IKEA. Connector entities 620, which lie on a path connecting the two anchor entities 601/602, are disposed in the interior of the circle 221. In this case, the connector entities 620 include entities relevant to Sweden, such as Alfred Nobel and the Swedish Parliament. Non-connector entities 610 (e.g. such as car makers FIAT and Peugeot) remain outside the circle 221.

Figure 6C:
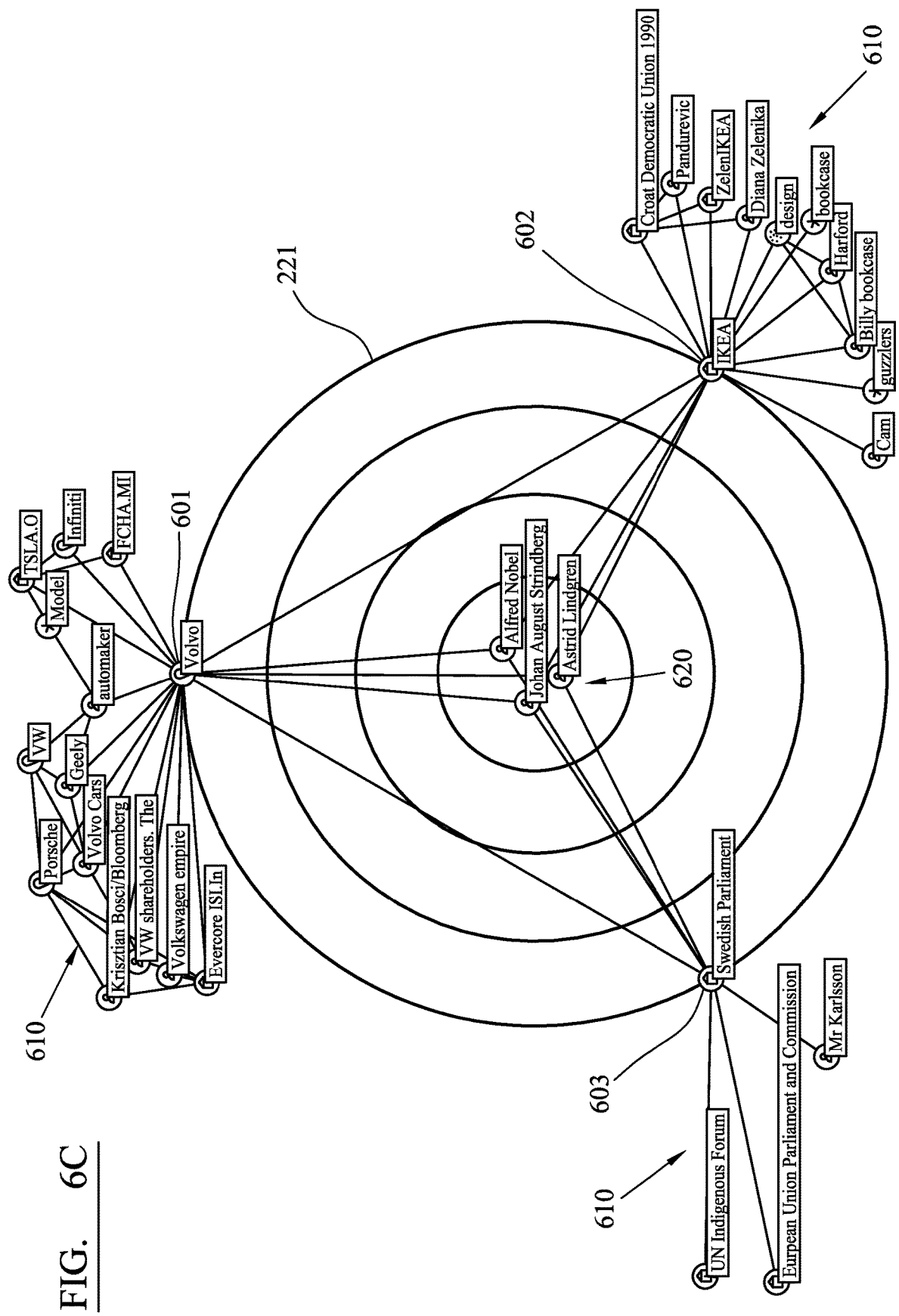

FIG. 6C shows the connection display section 220 with the addition of a third anchor entity 603, which represents the Swedish Parliament. This entity was a connector entity 620 in FIG. 6B, which has now been selected as an anchor.

Figure 6D:
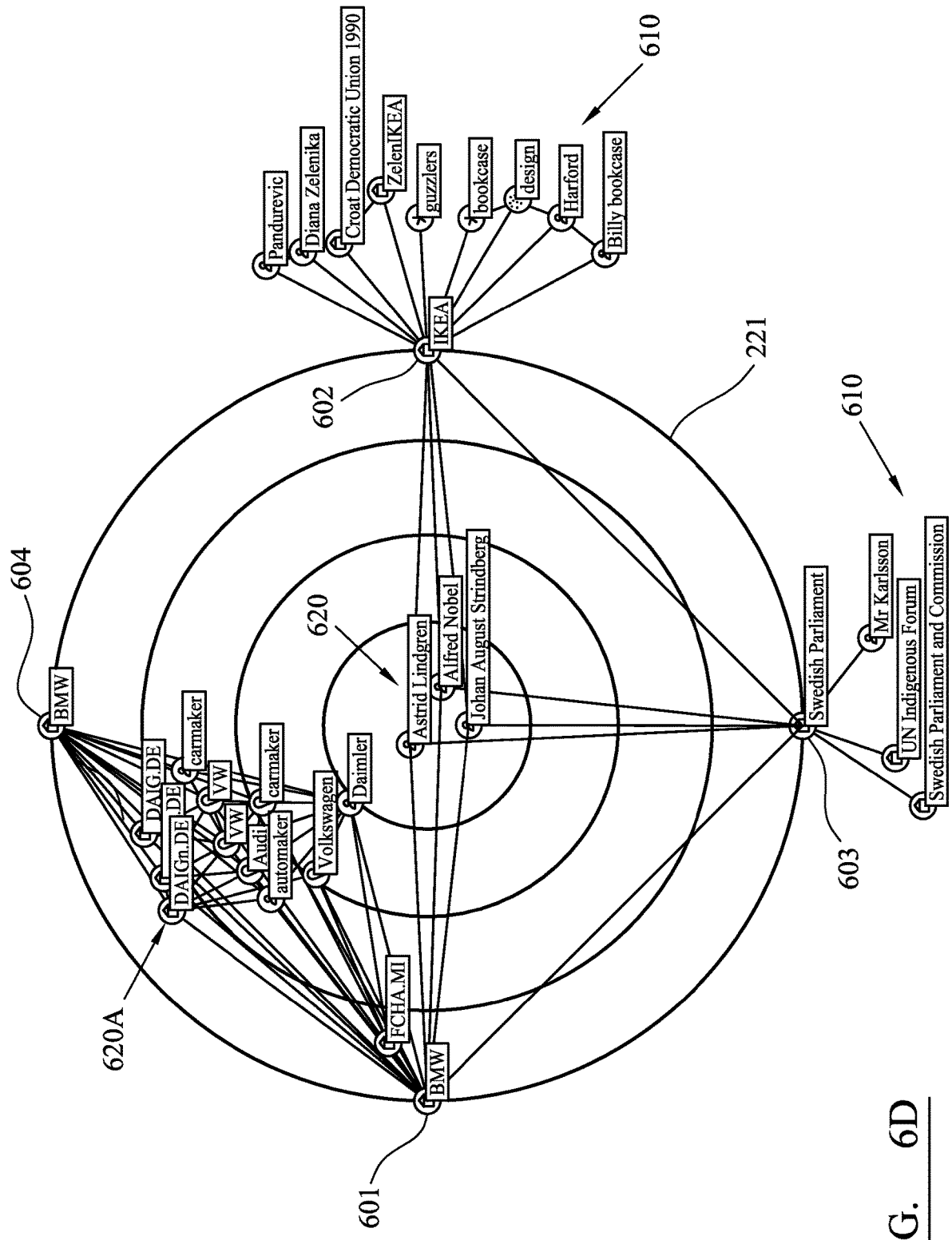

FIG. 6D shows the connection display section 220 with the addition of a fourth anchor entity 604, BMW. As another car maker, it is more closely related to anchor entity 601 than anchors 602/603. Accordingly, the ordering of the anchors 601-604 is adjusted as outlined above, so that more closely related anchors are placed closer together. As shown in FIG. 6D, not all the connector entities 620 are necessarily connected to all the anchors 601-604—the connector entities generally indicated with the reference numeral 620A only lie on a path connecting the anchors 601 and 604.

Figure 6E:
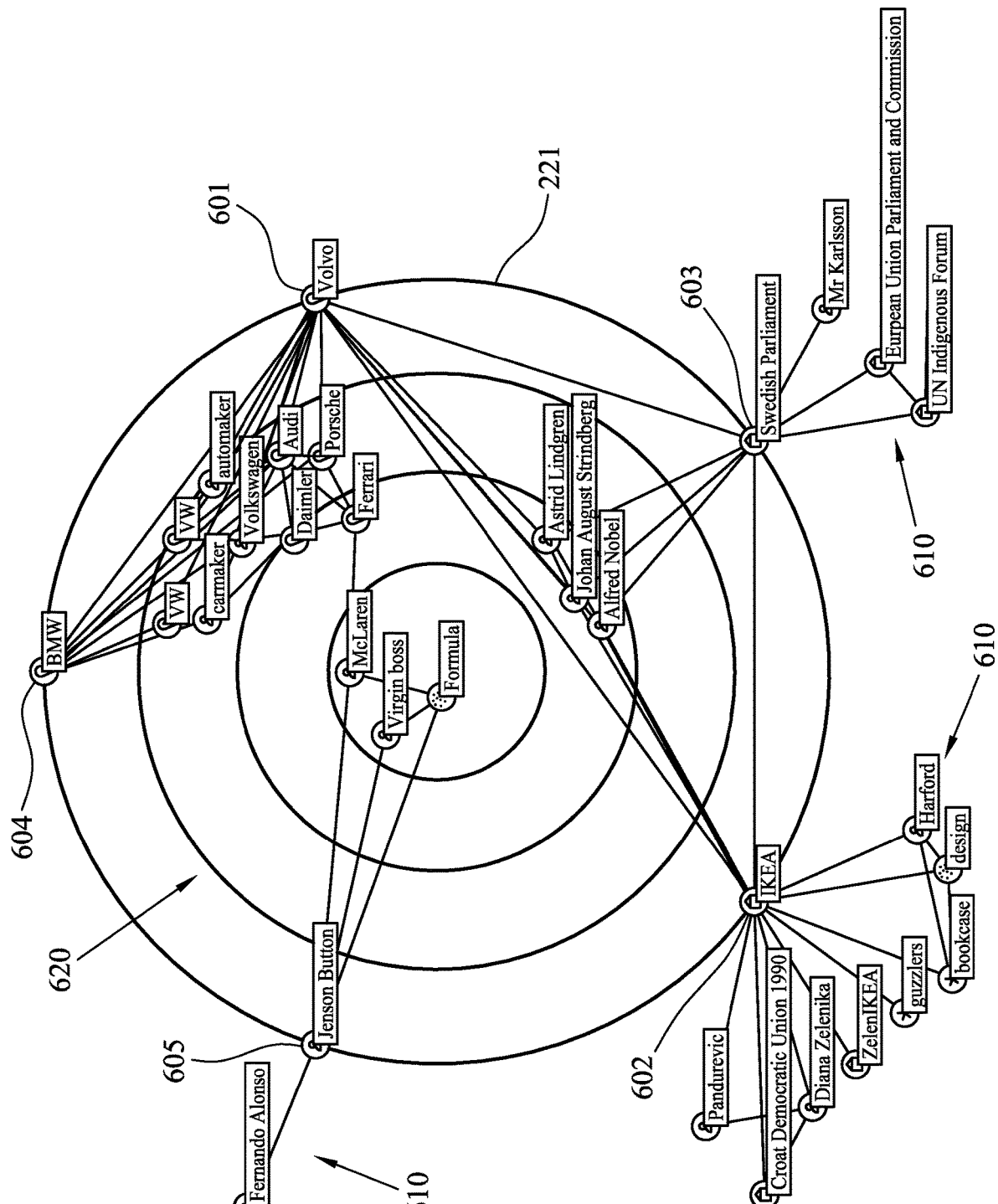

FIG. 6E shows the connection display section 220 with the addition of a fifth anchor entity 605, in this case Jenson Button. Again, the ordering of the anchors 601-605 is adjusted in order to place more closely related anchors together.

In each of FIG. 6B-6E, the distance of each connector entity 620 from the centre of the circle 221 is indicative of its relevance to the selected anchor entities 601-605.

Figure 4:
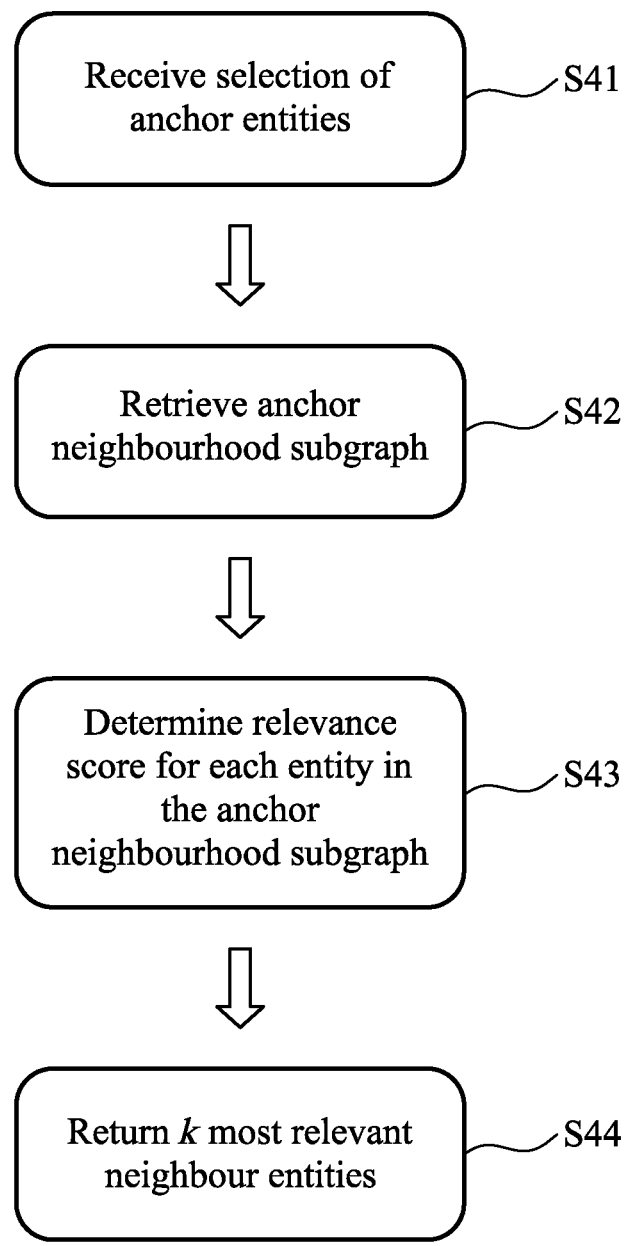
FIG. 4 is a flowchart of an example method of querying an entity network database.

FIG. 4 is a flowchart of an example method of querying an entity network database 130, as described above. The example method may include any of the steps described herein.

At step S41, the computer system 100 receives a selection of anchor entities. These may be selected via the user interface 150, and particularly via anchor input section 210.

At step S42, the ranking and retrieval module 140 retrieves an anchor neighbourhood subgraph from the entity network database 130, which includes the selected anchors and their neighbours.

At step S43, the ranking and retrieval module 140 determines a relevance score for each entity in the anchor neighbourhood subgraph. The relevance score may be a hybrid relevance score based on a significance score and a node centrality measure.

At step S43, the anchor neighbourhood subgraph is pruned to leave only the k most relevant neighbour entities, the anchor entities and the relationships therebetween. This pruned subgraph is then returned.

Figure 5:
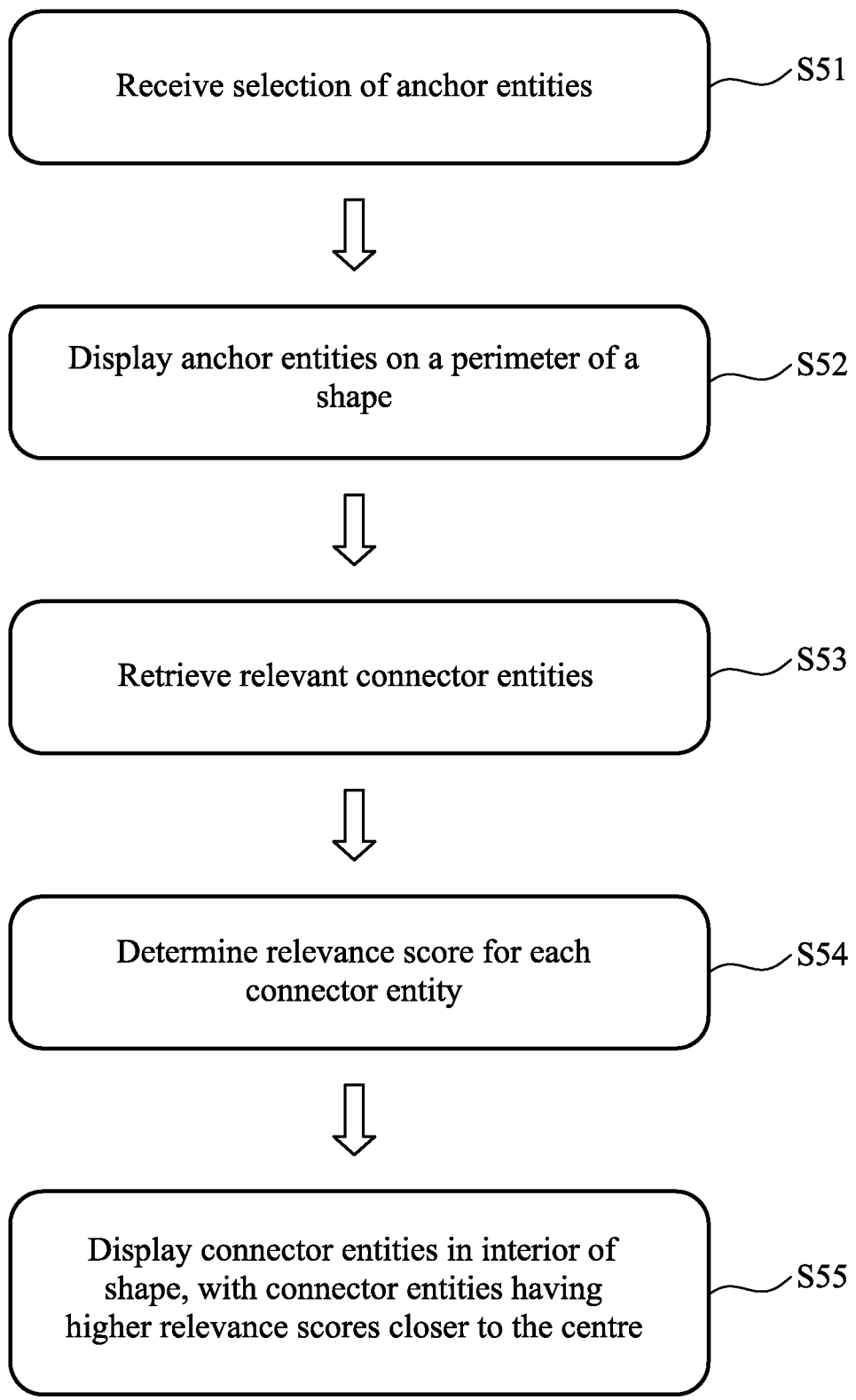
FIG. 5 is a flowchart of an example method of retrieving and displaying data from an entity network database.

FIG. 5 is a flowchart of an example method of method of retrieving and displaying data (i.e. entities and relationships) from an entity network database 130.

At step S51, the computer system 100 receives a selection of anchor entities. These may be selected via the user interface 150, and particularly via anchor input section 210.

At step S52, the anchor entities are displayed on a perimeter of a shape, for example on the circumference of a circle.

At step S53, a plurality of relevant connector entities are retrieved, based on the selected anchor entities. This may be accomplished by querying the entity network database 130, as described above, and selecting those entities that lie on a path connecting at least two anchors.

At step S54, a relevance score is determined for each connector entity. In one example, the relevance score is a node centrality measure.

At step S55, the connector entities are displayed in the interior of the shape, with connector entities having higher relevance scores positioned closer to the centre of the shape.

Various modifications and alterations may be made to the above-described system without departing from the invention. For example, the anchor entities 222 may be displayed around the periphery of another 2D or 3D shape, such as an oval, a polygon or a sphere. In other examples, the shape about which the anchor entities 222 are distributed is not rendered on screen.

It will be appreciated that the query methods and display methods set out herein are applicable to entity network databases generated and populated by any means. That is to say, the entity network database 130 need not be populated by ingestion module 110 and information extraction module 120.

In additional examples, the entity network database 130 may permit temporal querying. In other words, the entity network database 130 permits the retrieval of entities and relationships that were present within the database 130 in a specified time period (i.e. before a certain date/time, or in between two dates/times). Accordingly, the entity network database 130 may store a timestamp indicating the date/time of insertion of each entity and relationship, and the anchor neighbourhood subgraph retrieval unit 141 may be configured to retrieve the neighbourhood subgraph for the specified time period.

The methods described herein provide a technically-improved means of querying an entity network database. The technical task of retrieving salient data from complex, heavily interconnected graph databases is inherently difficult, and the methods described herein provide a means of determining the relevance of entities in the network so that highly relevant entities can be returned. Furthermore, the user interface provided assists the user in the technical task of querying the database, providing information representing the relevance of the results, and the way in which the returned entities are connected to the anchor entities that form the base of the query. A user may readily carry out a sequence of queries, in a continued interaction process. The display of relevant entities as described herein permits the user to search and retrieve data stored in the database in a more efficient and faster manner.

Advantageously, the above-described systems and methods provide a convenient and intuitive means of querying an entity network database. Rather than constructing a query string and receiving all matching results, the user simply inputs a plurality of relevant anchor entities about which further information is required, and the most relevant entities and relationships are retrieved, factoring in the importance of the entities to the anchors and the network as a whole.

Furthermore, the above-described systems and methods provide an intuitive means of displaying the entities, such that their relevance to the selected anchors can be immediately appreciated by the user interrogating the graph database. In addition, the user interface facilitates the construction of a series of related queries, by intuitively allowing the user to add and remove anchor entities, so that a user can easily uncover relevant connections concerning entities of interest that would not be discernible based on simple querying of the database.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer-implemented method of retrieving and displaying data from an entity network database, the entity network database comprising a plurality of entities and a plurality of relationships between the entities, the method comprising:

receiving a selection of a plurality of anchor entities of the entity network database;

retrieving a plurality of connector entities of the entity network database, each connector entity disposed on a path in the entity network database extending between at least two of the selected anchor entities;

determining a relevance score for each of the connector entities, the relevance score reflecting the relevance of each connector entity to the selected anchor entities; and displaying the connector entities within a shape defined by the selected anchor entities, wherein a distance of each connector entity from the selected anchor entities is based on the relevance score of the connector entity, wherein the retrieving the plurality of connector entities comprises:

retrieving an anchor neighbourhood subgraph from the entity network database, the anchor neighbourhood subgraph comprising the selected anchor entities and a plurality of neighbour entities, each neighbour entity being connected to at least one of the selected anchor entities by a relationship;

determining a relevance score for each of the neighbour entities in the anchor neighbourhood subgraph; and returning the k most relevant neighbour entities, the relationships therebetween, and the relationships between the k most relevant neighbour entities and the selected anchor entities.

2. The method of claim 1, wherein the shape is a circle.

3. The method of claim 1, comprising displaying the shape.

4. The method of claim 1, wherein determining the relevance score for each of the neighbour entities comprises determining a node significance score, based on a global degree of the entity, the global degree of the entity being the degree of the entity within the entity network database, and an internal degree of the entity, the internal degree being the degree of the entity within the anchor neighbourhood subgraph.

5. The method of claim 1, wherein determining the relevance score for each of the neighbour entities comprises determining a node centrality score for each of the neighbour entities.

6. The method of claim 1, wherein determining the relevance score for each of the neighbour entities comprises:

determining a node significance score, based on a global degree of the entity, the global degree of the entity being the degree of the entity within the entity network database, and an internal degree of the entity, the internal degree being the degree of the entity within the anchor neighbourhood subgraph;

determining a node centrality score for each of the neighbour entities; and determining the relevance score based on the node significance score and the node centrality score.

7. The method of claim 1, where k is in the range of 50 to 110.

8. The method of claim 1, further comprising:

retrieving non-connector entities of the entity network database, each non-connector entity being connected to only a single one of the selected anchor entities, and displaying the non-connector entities outside the shape.

9. The method of claim 1, further comprising displaying relationships between the connector entities and the selected anchor entities.

10. The method of claim 1, further comprising the step of ordering the selected anchor entities, wherein the ordering maximizes the relatedness of adjacent anchor entities.

11. The method of claim 10, wherein the step of ordering the selected anchor entities comprises computing a closeness measure between each pair of anchor entities of the selected plurality of anchor entities, based on a number of simple paths connecting each pair of anchor entities.

12. The method of claim 1, wherein the determining the relevance score for each of the connector entities comprises determining a node centrality score for each of the connector entities using a random walk algorithm.

13. A computer system comprising:
   at least one processor; and
   at least one memory storing:
      an entity network database, the entity network database comprising a plurality of entities and a plurality of relationships between the entities; and
      instructions that, when executed by the at least one processor cause the computer system to perform the method of claim 1.

14. A tangible non-transient computer-readable storage medium having recorded thereon instructions which, when implemented by a computer device, cause the computer device to perform the method of claim 1.

\* \* \* \* \*